(12) United States Patent
Haskins

(10) Patent No.: US 8,959,999 B2
(45) Date of Patent: Feb. 24, 2015

(54) PARTICULATE MATERIAL MONITORING SYSTEM

(76) Inventor: James H. Haskins, Glenburn, ND (US)

( * ) Notice: Subject to any disclaimer, the term of this patent is extended or adjusted under 35 U.S.C. 154(b) by 410 days.

(21) Appl. No.: 13/465,173

(22) Filed: May 7, 2012

(65) Prior Publication Data

US 2012/0285273 A1    Nov. 15, 2012

Related U.S. Application Data

(63) Continuation-in-part of application No. 13/107,370, filed on May 13, 2011, now Pat. No. 8,720,269.

(51) Int. Cl.
*G01F 23/02* (2006.01)
(52) U.S. Cl.
CPC ........................................ *G01F 23/02* (2013.01)
USPC ................................. 73/334; 73/323; 73/426
(58) Field of Classification Search
CPC ........................................................ G01F 23/02
See application file for complete search history.

(56) References Cited

U.S. PATENT DOCUMENTS

| | | | |
|---|---|---|---|
| 3,373,610 A | 3/1968 | Stieber | |
| 3,417,730 A | 12/1968 | Colley | |
| 3,880,005 A * | 4/1975 | Butterfield et al. | ............. 73/334 |
| 3,957,359 A | 5/1976 | Meginnis | |
| 3,983,752 A | 10/1976 | Holt | |
| 4,065,967 A | 1/1978 | Beeston | |
| 4,621,527 A | 11/1986 | Varga | |
| 5,735,168 A | 4/1998 | Harrison | |
| 5,763,776 A * | 6/1998 | Birch et al. | ..................... 73/323 |
| 5,974,877 A | 11/1999 | Burgess, Jr. | |
| 6,359,742 B1 | 3/2002 | Canty | |

* cited by examiner

*Primary Examiner* — Paul West
(74) *Attorney, Agent, or Firm* — Neustel Law Offices

(57) ABSTRACT

A particulate material monitoring system for efficiently monitoring the level of particulate material within a container. The particulate material monitoring system generally includes a flange defining a front opening, a viewing cover attached to the flange covering the front opening, a viewing wall connected to the flange and a rear opening extending through the viewing wall.

10 Claims, 11 Drawing Sheets

PARTICULATE MATERIAL MONITORING SYSTEM

CROSS REFERENCE TO RELATED APPLICATIONS

I hereby claim benefit under Title 35, United States Code, Section 120 of U.S. patent application Ser. No. 13/107,370 filed May 13, 2011. This application is a continuation-in-part of the Ser. No. 13/107,370 application. The Ser. No. 13/107,370 application is currently pending. The Ser. No. 13/107,370 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a grain bin monitoring devices and more specifically it relates to a particulate material monitoring system for efficiently monitoring the level of particulate material within a container.

2. Description of the Related Art

Any discussion of the related art throughout the specification should in no way be considered as an admission that such related art is widely known or forms part of common general knowledge in the field.

Particulate material containers (e.g. grain bins, grain carts, gravity wagons, trucks, etc.) are difficult to monitor the level of particulate material (e.g. grain, fertilizer) within the same. An individual filling a particulate material container often times must climb to the top of the container to determine the particulate material level. This is inefficient and increases the chances of injuries to workers.

One attempted solution to the inherent problem of containers is to have a clear piece of glass enclosing an opening within the containing wall of the container. However, it can be difficult for a user to view the level of particulate material based on the height, angle, lighting conditions and color of particular material.

Another attempted solution to the inherent problem of containers is to utilize a mechanical paddle within the container that is engaged by the particulate material, wherein the paddle then causes a pin to come out of the roof of the container or causes an object to change color. While these solutions are easier to view than the clear piece of glass discussed previously, they have moving mechanical components that are susceptible to failure.

Because of the inherent problems with the related art, there is a need for a new and improved particulate material monitoring system for efficiently monitoring the level of particulate material within a container.

BRIEF SUMMARY OF THE INVENTION

A system for efficiently monitoring the level of particulate material within a container. The invention generally relates to a grain bin monitoring device which includes a flange defining a front opening, a viewing cover attached to the flange covering the front opening, a viewing wall connected to the flange and a rear opening extending through the viewing wall.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
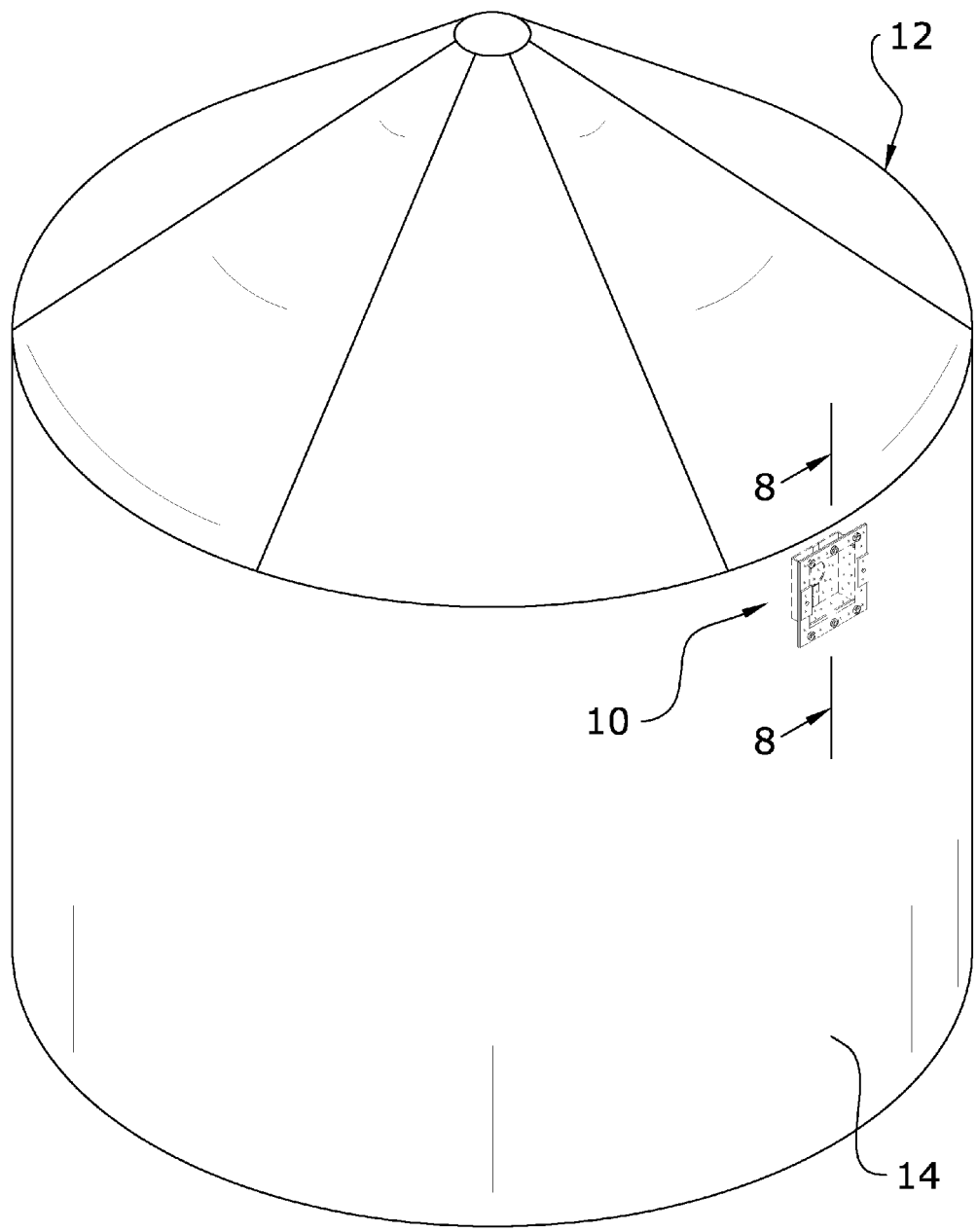
FIG. 1 is a front upper perspective view of the present invention installed within a particulate material container.

A. Overview.

Turning now descriptively to the drawings, in which similar reference characters denote similar elements throughout the several views, FIGS. 1 through 9c illustrate a particulate material monitoring system 10, which comprises a flange 20 defining a front opening 24, a viewing cover 40 attached to the flange 20 covering the front opening 24, a viewing wall 30 connected to the flange 20 and a rear opening 36 extending through the viewing wall 30. The particulate material (e.g. grain, fertilizer) is viewable via the front opening 24 so the user can determine the level of particulate material within the container 12.

B. Flange.

As illustrated in FIGS. 1 through 5 of the drawings, the flange 20 is a generally flat structure defining a perimeter. The flange 20 is preferably square or rectangular for manufacturing purposes, however the flange 20 may be comprised of various other shapes such as but not limited to circular or oval. The flange 20 preferably is comprised of a rectangular structure with an external width of approximately 7¾ inches and a height of approximately 8.5 inches.

Figure 2:
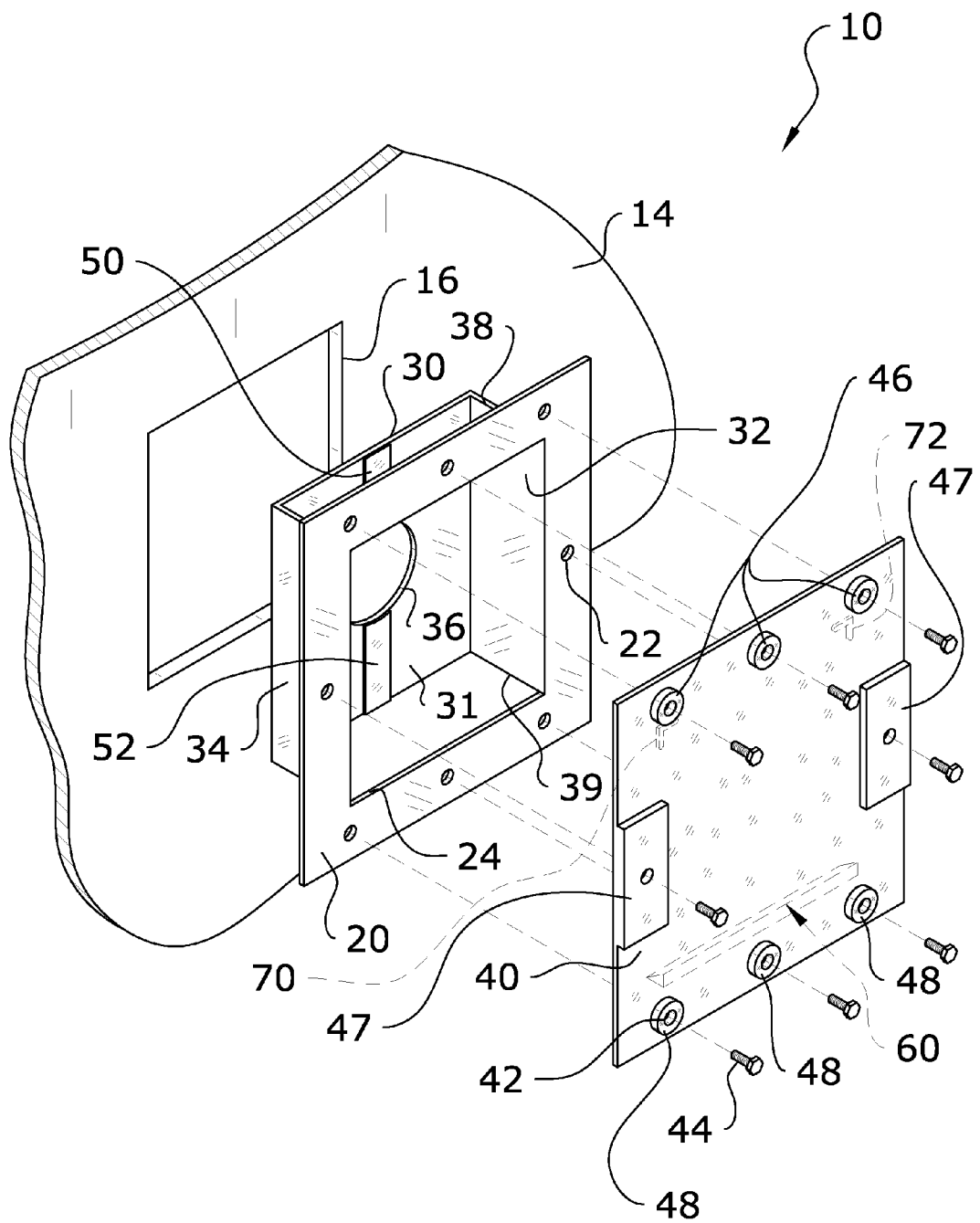
FIG. 2 is a exploded magnified front upper perspective view of the present invention with respect to the containing wall of the container.
Figure 3:
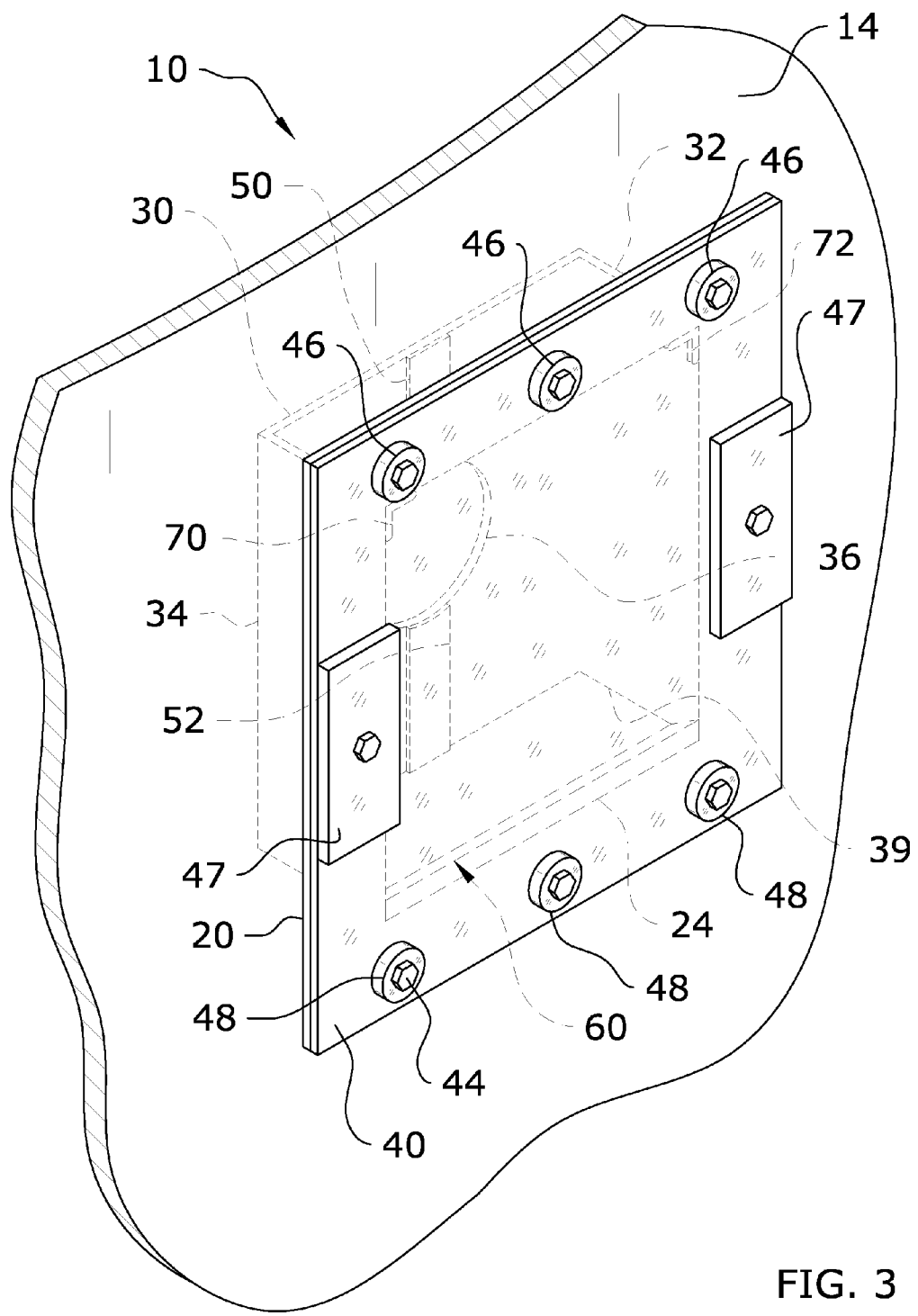
FIG. 3 is a magnified front upper perspective view of the present invention installed within a particulate material container.

The flange 20 is adapted to be attached to a containing wall 14 of a container 12 (e.g. grain bins, grain carts, gravity wagons, trucks, etc.) for particulate material. In particular, the flange 20 is adapted to be attached around a wall opening 16 within the containing wall 14 of the container 12 as best illustrated in FIGS. 2 and 3 of the drawings. The wall opening 16 preferably has a similar shape and is slightly larger than the front opening 24. The wall opening 16 within the containing wall 14 may be at various heights of the containing wall 14 to provide desired location(s) of particulate material measurement (e.g. the upper portion, the middle portion of the container 12).

Figure 5:
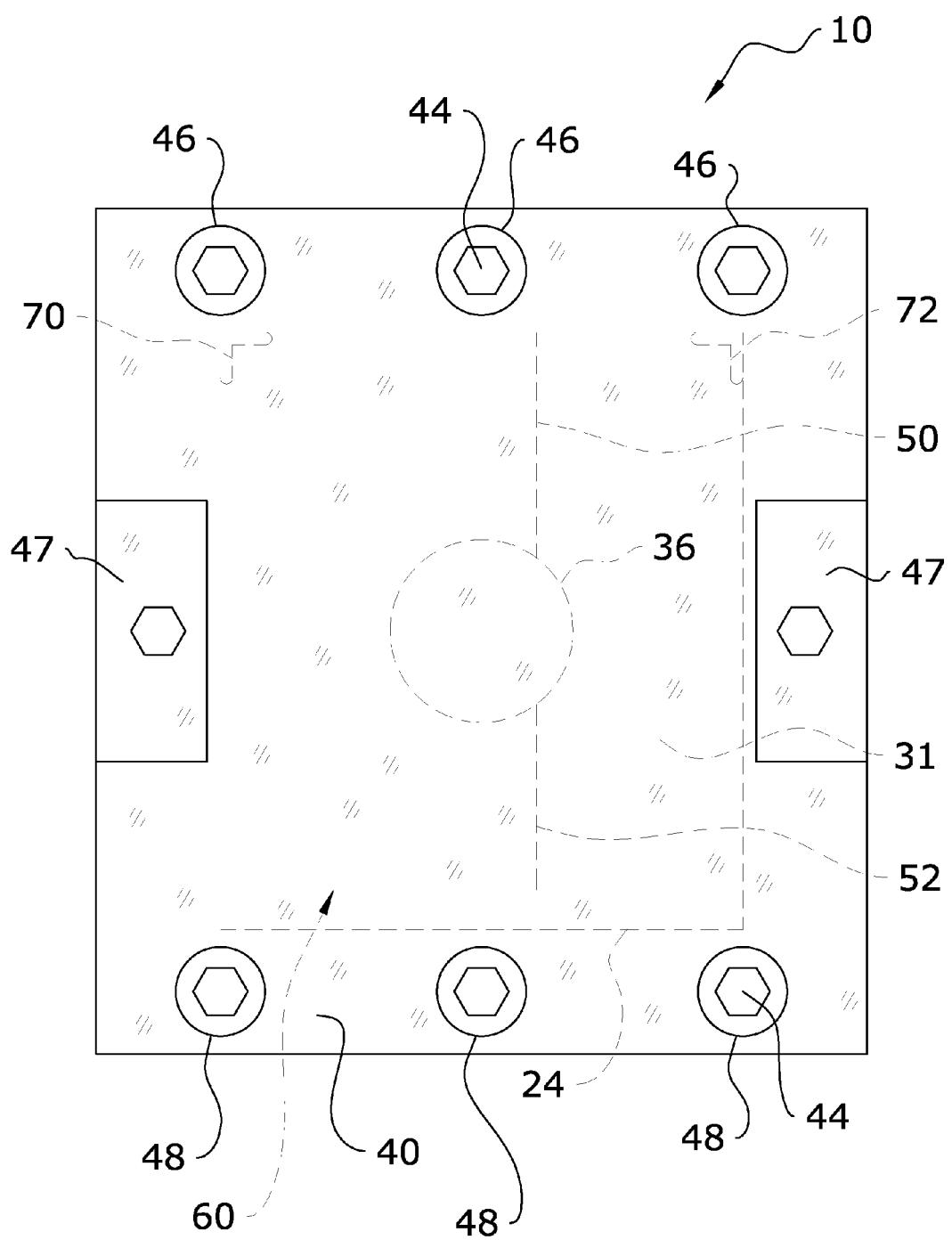
FIG. 5 is a front view of the present invention.

As best illustrated in FIGS. 2 and 5 of the drawings, the flange 20 defines a front opening 24 that provides for external viewing by an individual to determine the level of particulate material. The front opening 24 may have various shapes (e.g. square, circular, rectangular) and sizes sufficient to provide for adequate viewing of the particulate material within. The front opening 24 is preferably comprised of a rectangular structure having a width of approximately 4¼ inches and a height of approximately 6 inches to provide a sufficient viewing size.

Figure 4:
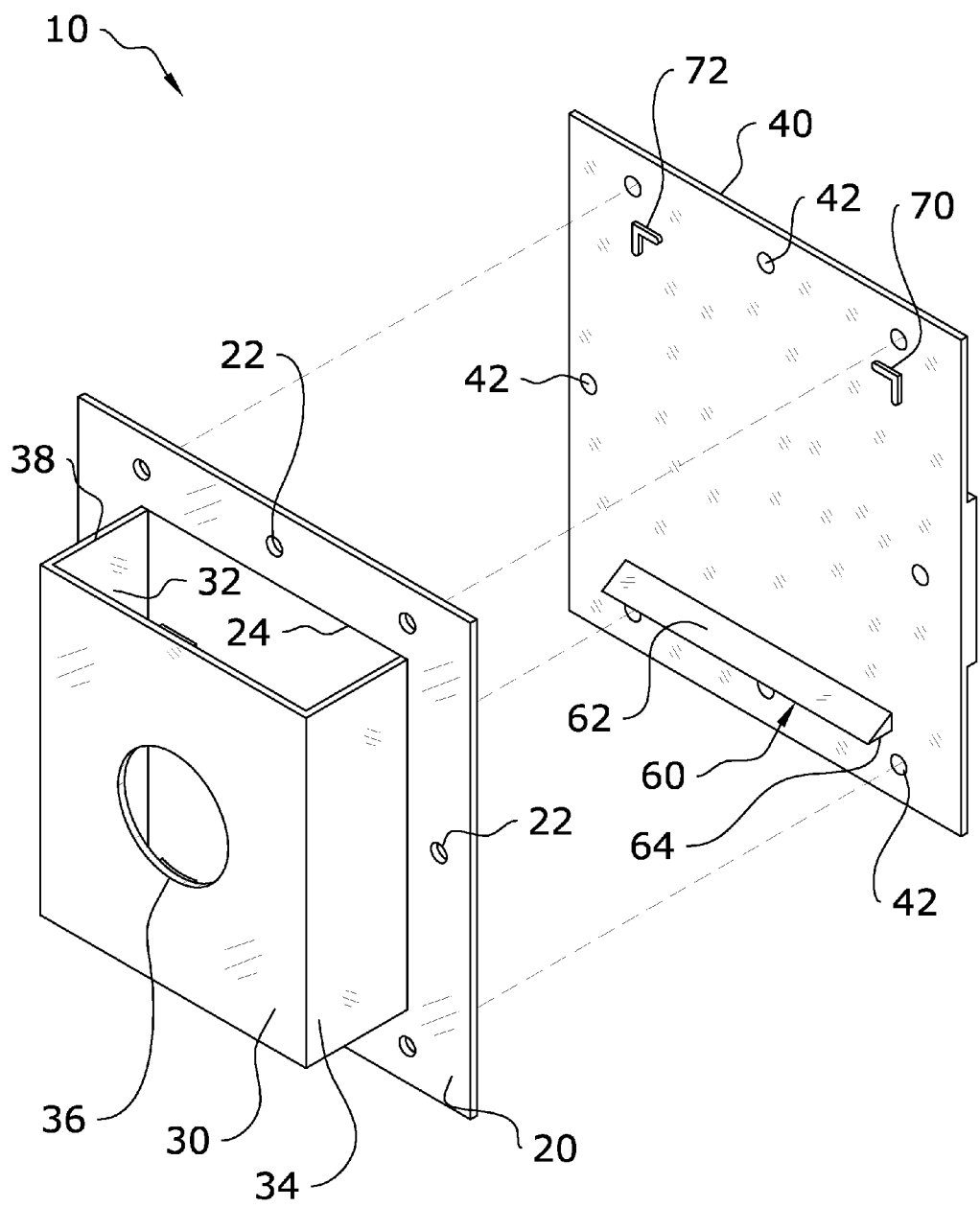
FIG. 4 is a rear upper perspective view of the present invention without the viewing cover.
Figure 6:
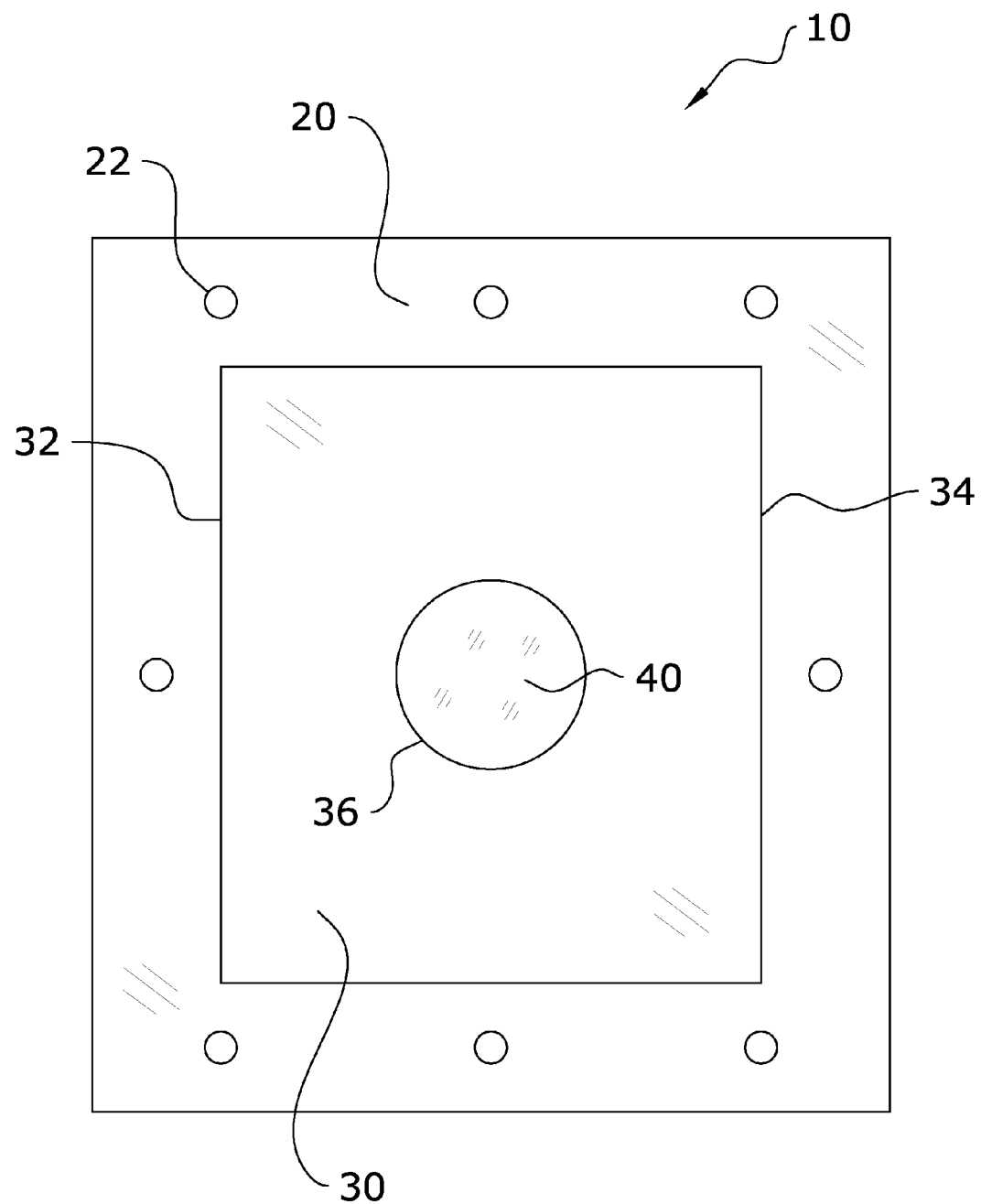
FIG. 6 is a rear view of the present invention.

As illustrated in FIGS. 2, 4 and 6 of the drawings, the flange 20 preferably includes a plurality of flange apertures 22 adapted to receive a corresponding plurality of fasteners 44 that secure the flange 20 to the containing wall 14. The fasteners 44 are preferably threaded to threadably engage the containing wall 14 or threaded nuts on the inside of the containing wall 14. A seal is preferably positioned between the flange 20 and the exterior surface of the containing wall 14 to provide a seal between the flange 20 and the containing wall 14 to prevent water from entering the container 12.

C. Viewing Cover.

The viewing cover 40 is comprised of a size and shape sufficient to completely cover the front opening 24. The viewing cover 40 is attached to the flange 20 and entirely covers the front opening 24 as best illustrated in FIG. 3 of the drawings. The viewing cover 40 may include cover apertures 42 that correspond to the flange apertures 22 within the flange 20 for the fasteners 44 to extend through as illustrated in FIG. 2 of the drawings. A plurality of upper reinforcements 46 surround the upper cover apertures 42 and a plurality of lower reinforcements 48 surround the lower cover apertures 42 to provide reinforcement to the viewing cover 40 when the fasteners 44 are tightened as illustrated in FIG. 2 of the drawings. A pair of opposing side reinforcements 47 preferably surround the side cover apertures 42 to provide reinforcement to the viewing cover 40 when the fasteners 44 are tightened as illustrated in FIG. 2 of the drawings. The pair of opposing side reinforcements 47 are preferably elongated extending in a vertical manner above and below the side cover apertures 42 as further shown in FIG. 2 of the drawings. The pair of opposing side reinforcements 47 further preferably have a substantially rectangular structure. The reinforcements 46, 47, 48 are preferably integrally formed within the viewing cover 40 and extend outwardly from the outer surface of the viewing cover 40 to provide increased thickness for the viewing cover 40 surrounding the cover apertures 42. The viewing cover 40 is attached to the flange 20 in a sealed manner to prevent water or other debris from entering the container 12.

The viewing cover 40 is comprised of a transparent material to allow an individual to view the area behind the viewing cover 40 to determine the level of particulate material. The viewing cover 40 is preferably not colored, however, the viewing cover 40 may have a color or tint to the same. The viewing cover 40 may also be comprised of various types of transparent materials such as but not limited to glass, plastic and polycarbonate.

Figure 7:
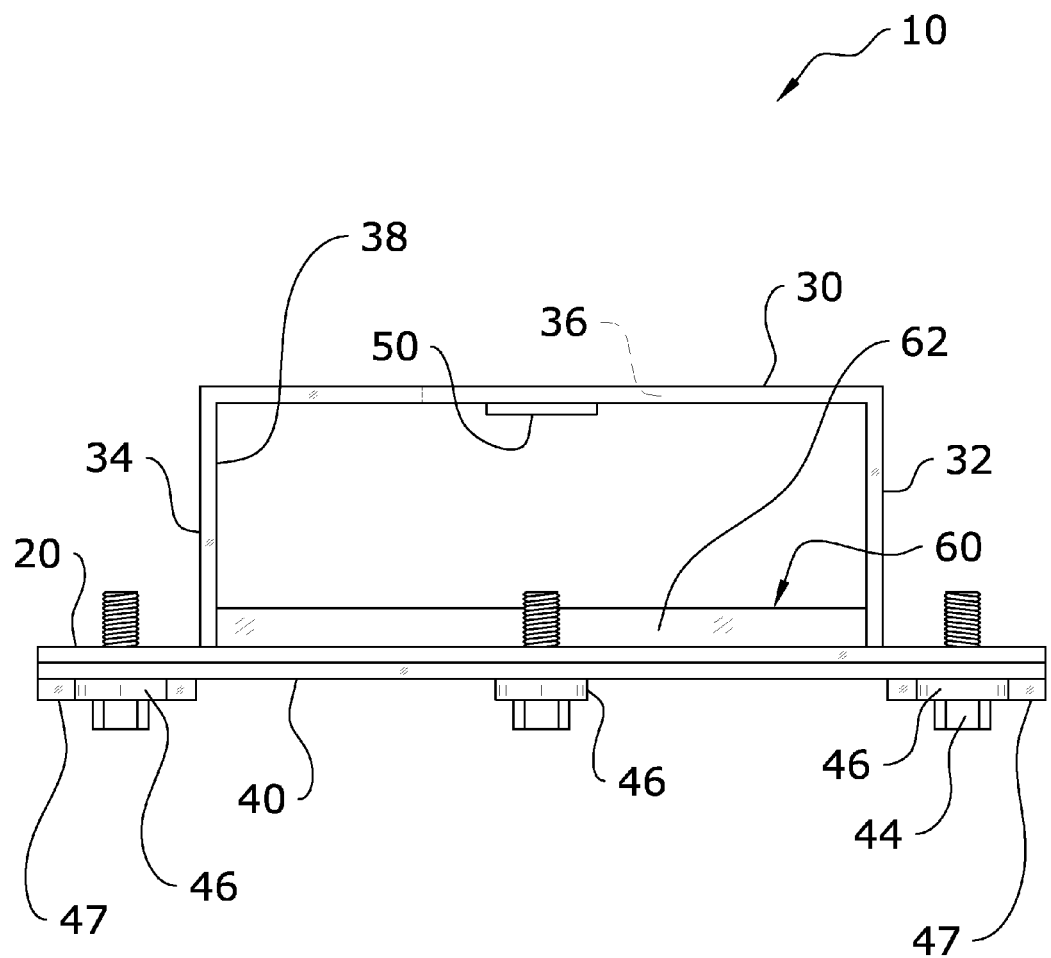
FIG. 7 is a top view of the present invention.
Figure 8:
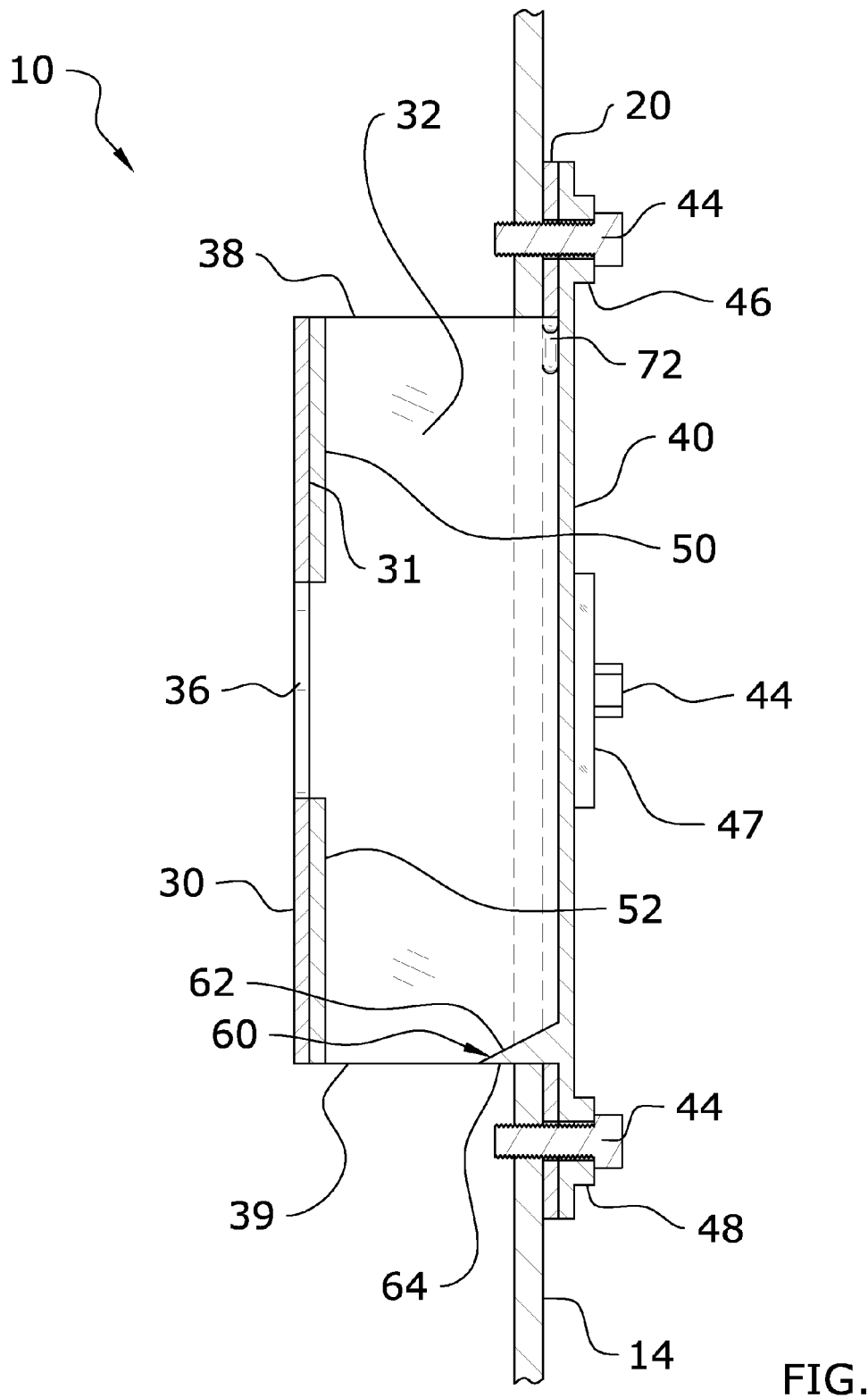
FIG. 8 is a cross sectional view taken along line 8-8 of FIG. 1 showing a side cutaway view of the present invention installed within the particulate material container.
Figure 9A:
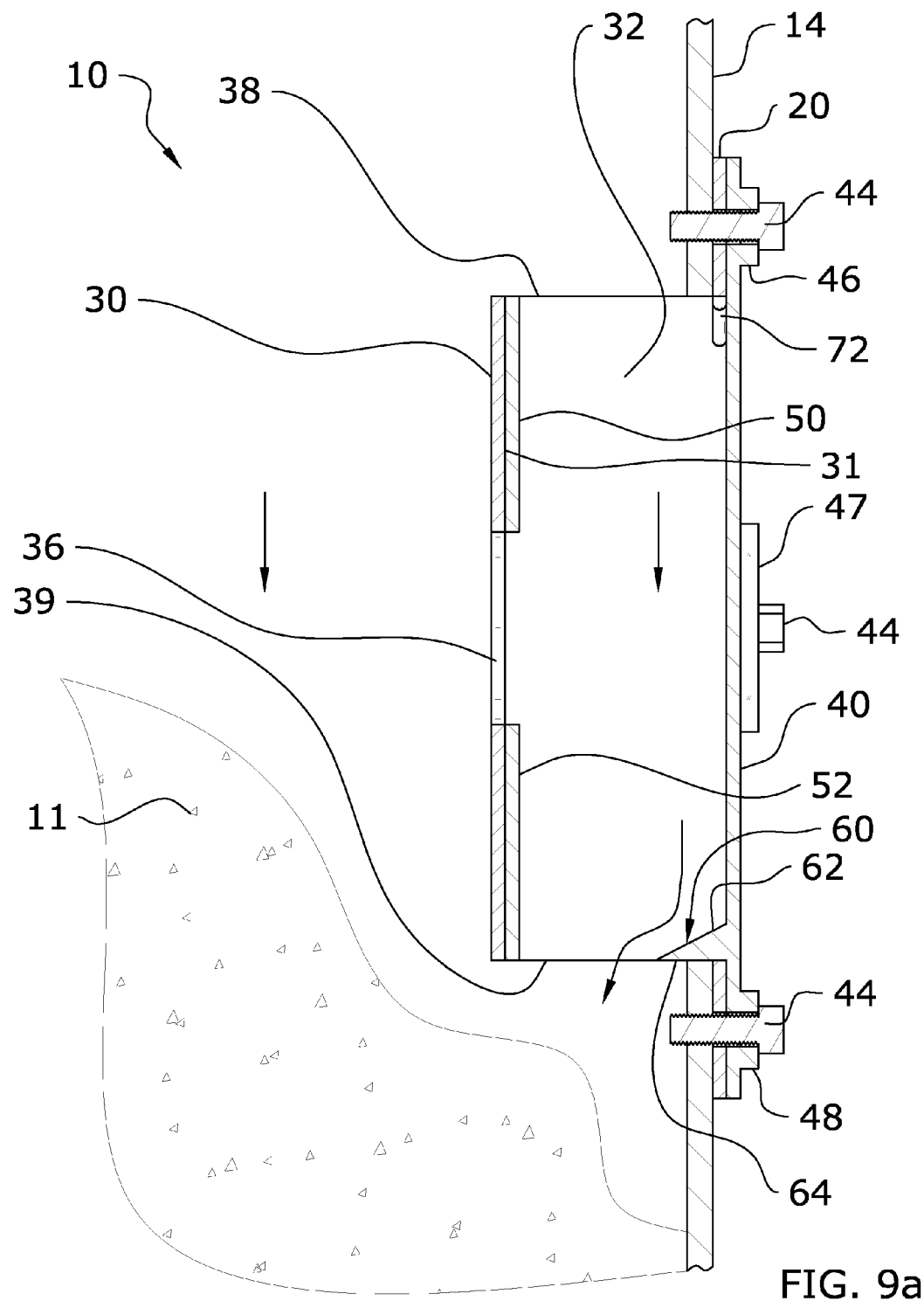
FIG. 9a is a side cutaway view of the present invention installed within the particulate material container with the particulate material level below the front opening within the present invention.
Figure 9B:
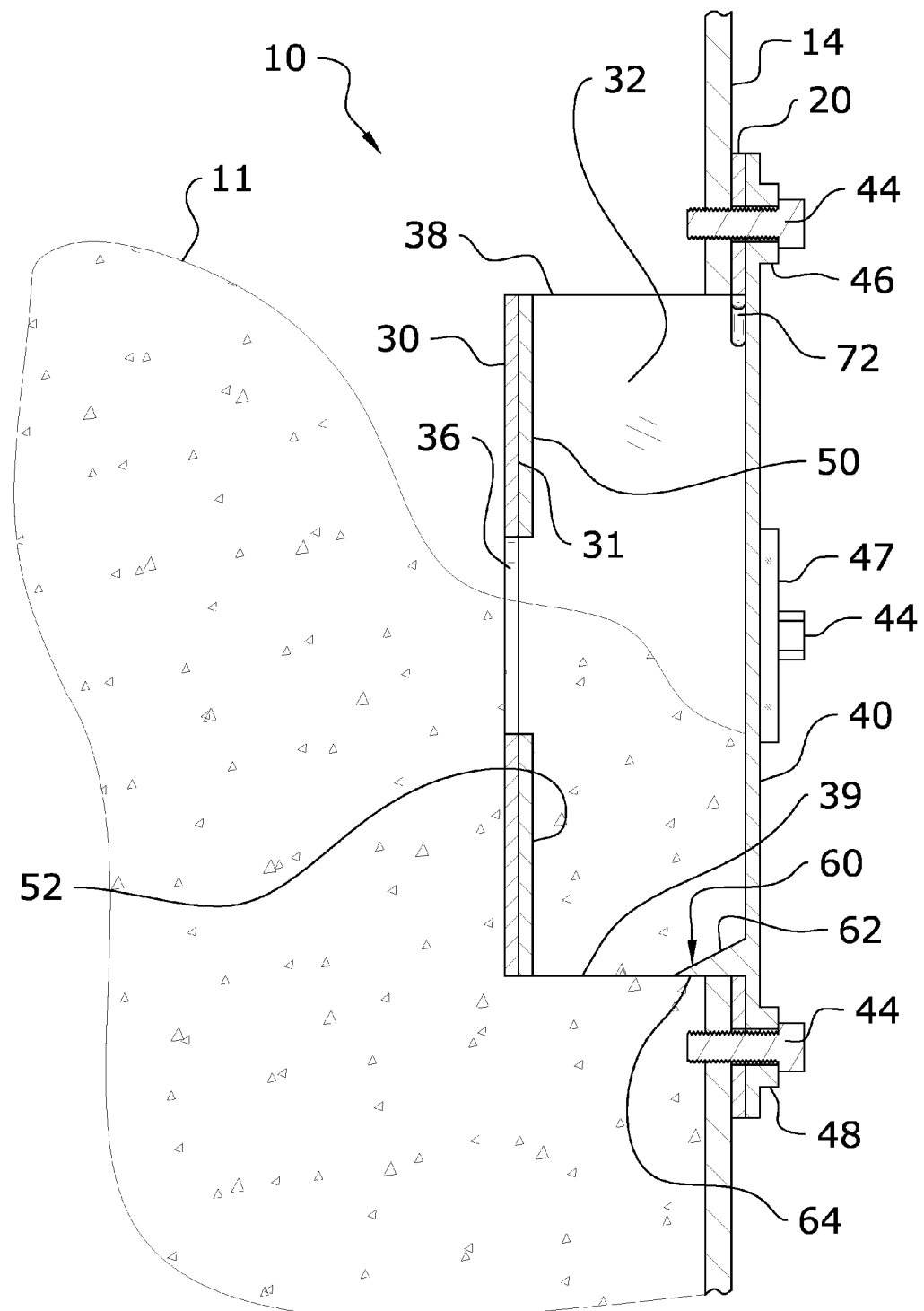
FIG. 9b is a side cutaway view of the present invention installed within the particulate material container with the particulate material level partially covering the front opening within the present invention.
Figure 9C:
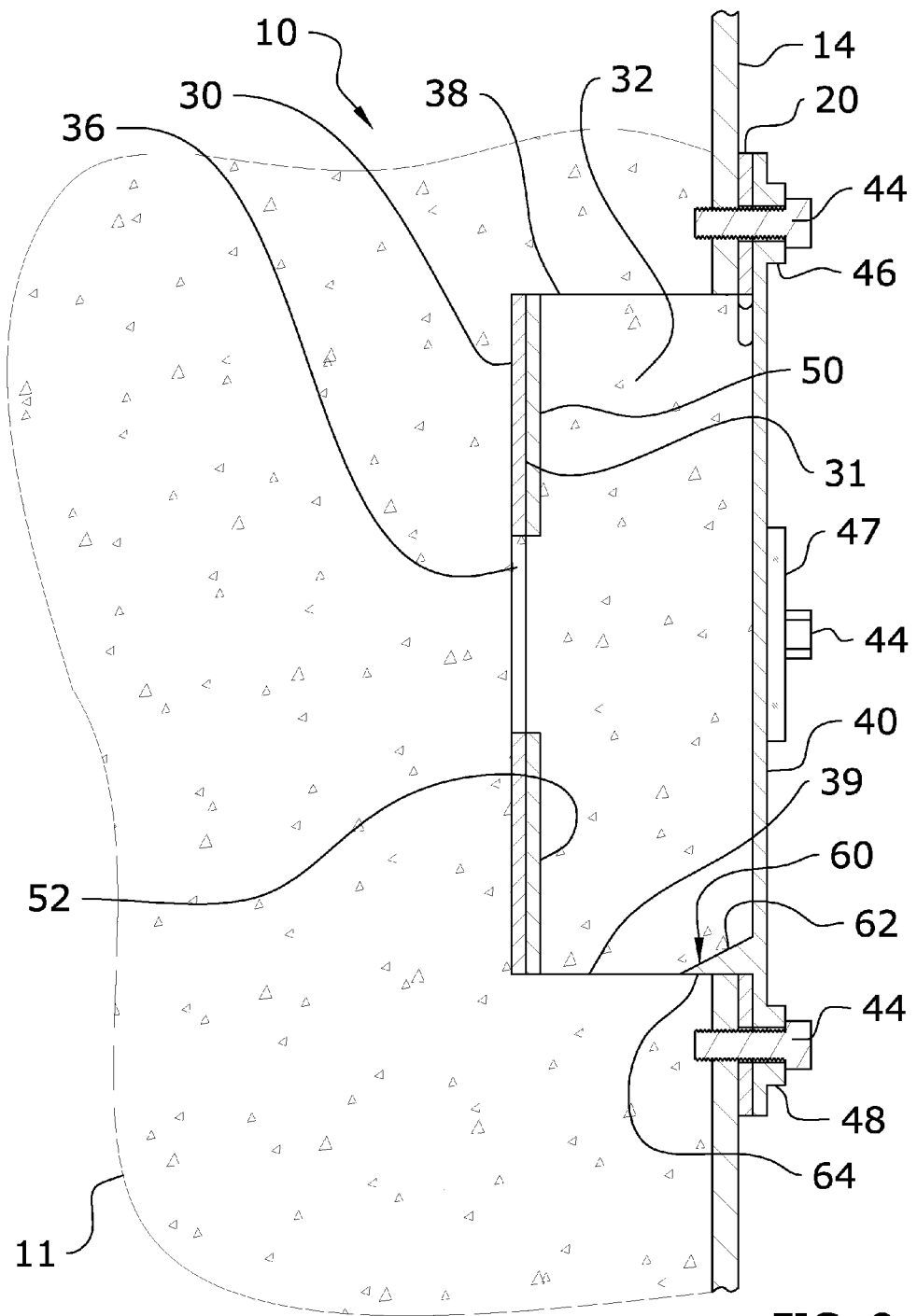
FIG. 9c is a side cutaway view of the present invention installed within the particulate material container with the particulate material level completely covering the front opening.

As illustrated in FIGS. 2 through 5, 7 through 9c of the drawings, a deflector 60 preferably extends inwardly from the lower portion of the viewing cover 40. The deflector has a lower surface 64 that preferably extends inwardly into the container 12 in a substantially horizontal manner to overlap the lower ledge of the wall opening 16 and the flange 20 as best illustrated in FIGS. 8 through 9c of the drawings. The deflector 60 preferably extends past the containing wall 14 of the container 12 as best illustrated in FIG. 8 of the drawings. The deflector 60 further preferably includes an upper inclined surface 62 that extends upwardly from the distal portion of the deflector 60 to an inner portion of the deflector 60 as best illustrated in FIG. 8 of the drawings. The upper inclined surface 62 deflects the particulate material 11 that falls downwardly through the upper opening 38 to prevent the particulate material from resting upon or hanging up on the lower ledge of the wall opening 16 or the flange 20 as illustrated in FIG. 9a of the drawings. As the particulate material 11 falls downwardly, the particulate material 11 engages the upper inclined surface 62 of the deflector 60 and is deflected inwardly away from the containing wall 14 as illustrated in FIG. 9a of the drawings. The deflection of the particulate material 11 ensures that no particulate material accidentally remains in view through the viewing cover 40 when the level of the particulate material is below the viewing cover 40. The deflector 60 is preferably integrally formed within the viewing cover 40 and extends from the inner surface of the viewing cover 40 as illustrated in FIG. 9a of the drawings.

FIGS. 3 through 5 illustrate a first alignment member 70 and a second alignment member 72 extending from an inner surface of the viewing cover 40 to align the viewing cover 40 with the upper interior corners of the front opening 24 within the flange 20. The alignment members 70 preferably have mirrored structures and each preferably have an L-shaped structure as illustrated in FIGS. 3 through 5 of the drawings. The alignment members 70 are preferably integrally formed within the viewing cover 40 and extend from the inner surface of the viewing cover 40 as illustrated in FIG. 4 of the drawings.

D. Viewing Wall.

The viewing wall 30 is distally positioned a finite distance rearwardly from the flange 20 as best illustrated in FIGS. 2, 4 and 8 of the drawings. The viewing wall 30 is preferably comprised of a generally flat and vertically orientated structure. The viewing wall 30 is preferably substantially parallel with respect to the flange 20 and the containing wall 14 when installed within the container 12.

The viewing wall 30 includes a viewing surface 31 facing the front opening 24 as best illustrated in FIGS. 2, 5 and 8 of the drawings. The viewing surface 31 is comprised of a highly visible color or other composition that is easily viewed from a distance and at various angles by a user. For particulate material comprised of grain, it is preferably to have a viewing surface 31 comprised of a white color. However, for other types of particulate material such as fertilizer, various other colors may be utilized (e.g. black, red, green, blue). The viewing surface 31 provides a viewing contrast for the user so they can easily see the level of particulate material with respect to the viewing surface 31.

As illustrated FIG. 5 of the drawings, the viewing wall 30 is preferably approximately the same size and shape of the front opening 24. The viewing wall 30 preferably has a height of approximately 6 inches and a width of approximately 5 inches.

It is further preferable to have a reflective strip 50, 52 attached to the viewing surface 31 of the viewing wall 30 to enhance the viewing of the level of grain or other particulate material 11 as illustrated in FIGS. 2, 3 and 5 of the drawings. The reflective strip 50, 52 may be comprised of a single strip of light reflective material or the reflective strip 50, 52 may be comprised of an upper reflective strip 50 positioned above the rear opening 36 and a lower reflective strip 52 positioned below the rear opening 36. The reflective strip 50, 52 is further vertically orientated in an up and down alignment to provide an accurate measurement of the particulate material 11 as illustrated in FIGS. 2, 3 and 5 of the drawings. The reflective strip 50, 52 allows for accurate reading of the level of particulate material 11 during daylight or in reduced light conditions (e.g. night time) by shining a light upon the reflective strip 50, 52 which illuminates the reflective strip 50, 52 for easy viewing from a distance by the user.

E. Rear Opening.

FIGS. 2 through 8 illustrate the rear opening 36 extending through the viewing wall 30. The rear opening 36 is preferably centrally located within the viewing wall 30 as illustrated in FIG. 4 of the drawings. The rear opening 36 is preferably smaller than the front opening 24 as further illustrated in FIG. 5 of the drawings. The rear opening 36 may be comprised of various shapes such as but not limited to circular, square and rectangular. The rear opening 36 is preferably comprised of a circular opening having a diameter of approximately 1¾ inches. The rear opening 36 allows for the particulate material to enter between the viewing wall 30 and the containing wall 14 of the container 12 as illustrated in FIG. 9b of the drawings. The rear opening 36 also provides for an additional viewing contrast for the user.

F. Sidewalls.

The viewing wall 30 is connected a finite distance from the flange 20 as illustrated in the drawings. It is preferable that the viewing wall 30 be positioned approximately 2 inches away from the flange 20 to provide sufficient space for the particulate material to pass through freely and to enhance the viewing of the particulate material with respect to the viewing surface 31.

It is preferable that a first sidewall 32 and a second sidewall 34 are connected between the flange 20 and the viewing wall 30. The first sidewall 32 extends rearwardly from a first side of the flange 20 and is connected to the viewing wall 30 as shown in FIGS. 4 and 7 of the drawings. The second sidewall 34 extends rearwardly from a second side of the flange 20 and is connected to the viewing wall 30 opposite of the first sidewall 32 as shown in FIGS. 4 and 7 of the drawings.

The first sidewall 32 is preferably substantially parallel with respect to the second sidewall 34 as illustrated in FIGS. 4 and 8 of the drawings. The flange 20, the viewing wall 30, the first sidewall 32 and the second sidewall 34 define an upper opening 38 and a lower opening 39 that are adapted to allow for the passage of particulate material as illustrated in FIG. 9c of the drawings. The flange 20, the viewing wall 30, the first sidewall 32 and the second sidewall 34 further preferably define a U-shaped passage that allows for the passage of the particulate material within.

G. Operation of Preferred Embodiment.

In use, the user first cuts out a wall opening 16 at a desired elevation within the containing wall 14 of the container 12 as illustrated in FIG. 2 of the drawings. After the wall opening 16 is created, the user then inserts the present invention into the wall opening 16 such that the flange 20 is adjacent to the exterior surface of the containing wall 14. A seal may be positioned between the flange 20 and the containing wall 14 to provide a sealed attachment or a sealing material may be added after installation. The fasteners 44 are inserted through the cover apertures 42 within the viewing cover 40, the flange apertures 22 of the flange 20 and into the containing wall 14 to securely retain the present invention within the container 12 as illustrated in FIGS. 1 and 2 of the drawings. It can be appreciate that more than one of the present invention may installed within a single container 12 to provide visual readings at various heights within the container 12.

When the user fills the container 12 with particulate material, the user is able to initially view the viewing surface 31 and/or the reflective strip 50, 52 of the viewing wall 30 without obstruction by the particulate material as illustrated in FIG. 9a of the drawings. The deflector 60 prevents the deposit of particulate material 11 on the lower edge of the wall opening 16 or other edges of the present invention. When the level of the particulate material within the container 12 gets to a level that the particulate material is able to extend upwardly through the lower opening 39 and through the rear opening 36, the user is able to the particulate material and the upper portion of the viewing surface 31 indicating that the particulate material is approximately to a desired level. In addition, the reflective strip 50, 52 will be partially covered to illustrate the level of particulate material 11 in the container 12. When the particulate material rises above the upper opening 38, the particulate material substantially covers the viewing surface 31 and/or the reflective strip 50, 52 thereby visually indicating to the user than the level of particulate material is at or above the top of the viewing wall 30. The user may terminate filling of the container 12 or wait for the particulate material to reach another of the present invention at a higher elevation. The same process may be used when removing particulate material from the container 12 just in reverse.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A particulate material monitoring system, comprising:
   a flange defining a front opening, wherein said flange is adapted to be attached to a containing wall of a container for particulate material and adapted to at least partially surround a wall opening within said containing wall;
   a viewing cover attached to said flange covering said front opening, wherein said viewing cover is comprised of a transparent material and wherein said viewing cover is attached in a sealed manner with respect to said flange;

a deflector having an upper inclined surface extending from a lower portion of the viewing cover and adapted to extend inwardly through said wall opening of said containing wall above a lower edge of said wall opening;

a viewing wall, wherein said viewing wall is distally positioned a finite distance rearwardly from said flange;

a first sidewall, wherein said first sidewall extends rearwardly from a first side of said flange and wherein said first sidewall is connected to said viewing wall; and a second sidewall, wherein said second sidewall extends rearwardly from a second side of said flange, wherein said second sidewall is connected to said viewing wall opposite of said first sidewall, wherein said first sidewall is substantially parallel with respect to said second sidewall, and wherein said flange, said viewing wall, said first sidewall and said second sidewall define an upper opening and a lower opening that are adapted to allow for the passage of particulate material.

2. The particulate material monitoring system of claim 1, including a rear opening extending through said viewing wall.

3. The particulate material monitoring system of claim 2, wherein said rear opening is centrally located within said viewing wall.

4. The particulate material monitoring system of claim 2, wherein said rear opening is smaller than said front opening.

5. The particulate material monitoring system of claim 1, wherein said viewing wall includes a viewing surface facing said front opening.

6. The particulate material monitoring system of claim 5, wherein said viewing surface is comprised of a highly visible color.

7. The particulate material monitoring system of claim 1, including a reflective strip attached to said viewing wall that reflects light.

8. The particulate material monitoring system of claim 1, wherein said viewing wall is approximately the same size and shape of said front opening.

9. The particulate material monitoring system of claim 1, wherein said flange includes a plurality of flange apertures adapted to receive a corresponding plurality of fasteners.

10. A particulate material monitoring system, comprising:

a flange defining a front opening, wherein said flange is adapted to be attached to a containing wall of a container for particulate material and adapted to at least partially surround a wall opening within said containing wall;

a viewing cover attached to said flange covering said front opening, wherein said viewing cover is comprised of a transparent material and wherein said viewing cover is attached in a sealed manner with respect to said flange;

a deflector having an upper inclined surface extending from a lower portion of the viewing cover and adapted to extend inwardly through said wall opening of said containing wall above a lower edge of said wall opening;

a viewing wall, wherein said viewing wall is distally positioned a finite distance rearwardly from said flange, wherein said viewing wall includes a viewing surface facing said front opening, wherein said viewing surface is comprised of a highly visible color;

a reflective strip attached to said viewing wall that reflects light;

wherein said viewing wall is parallel with respect to said flange;

a first sidewall, wherein said first sidewall extends rearwardly from a first side of said flange and wherein said first sidewall is connected to said viewing wall;

a second sidewall, wherein said second sidewall extends rearwardly from a second side of said flange, wherein said second sidewall is connected to said viewing wall opposite of said first sidewall, wherein said first sidewall is substantially parallel with respect to said second sidewall, and wherein said flange, said viewing wall, said first sidewall and said second sidewall define an upper opening and a lower opening that are adapted to allow for the passage of particulate material;

a rear opening extending through said viewing wall, wherein said rear opening is centrally located within said viewing wall and wherein said rear opening is smaller than said front opening.

* * * * *